United States Patent Office 3,830,891
Patented Aug. 20, 1974

3,830,891
NITROPHENYL PHOSPHORUS ACID ESTERS
Jozef Drabek, Allschwil, Switzerland, assignor to Ciba-Geigy Corporation, Ardsley, N.Y.
No Drawing. Filed Dec. 15, 1972, Ser. No. 315,388
Claims priority, application Switzerland, Dec. 16, 1971, 18,439/71; Oct. 27, 1972, 15,728/72
Int. Cl. A01n 9/36; C07f 9/18
U.S. Cl. 260—954                    5 Claims

ABSTRACT OF THE DISCLOSURE

Nitrophenylthiolphosphoric esters of the formula

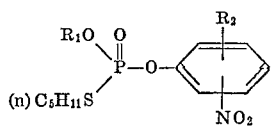

wherein
$R_1$ represents methyl or ethyl, and
$R_2$ represents hydrogen, methyl or chlorine,
processes for their manufacture and their use in pest control.

---

The present invention relates to nitrophenylthiolphosphoric esters, a process for their manufacture and their use in pest control.

The nitrophenylthiolphosphoric esters have the formula

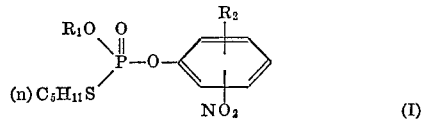

wherein $R_1$ represents methyl or ethyl, $R_2$ represents hydrogen, methyl or chlorine.

The compounds of the formula I can be manufactured by the following methods which are known in the art:

(1a)
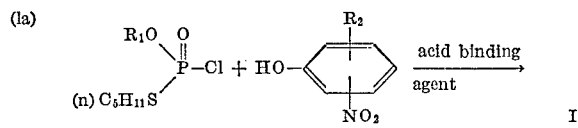

(1b)
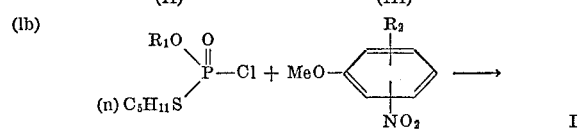

(2)
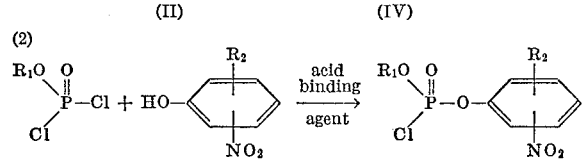

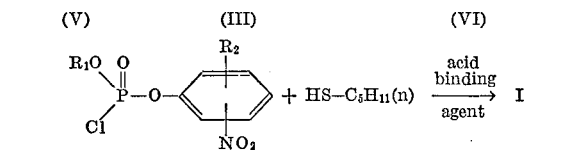
oder
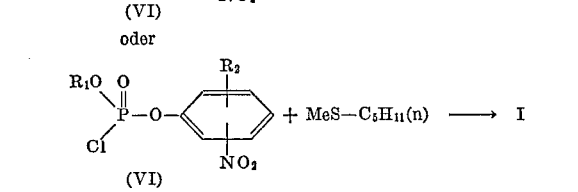

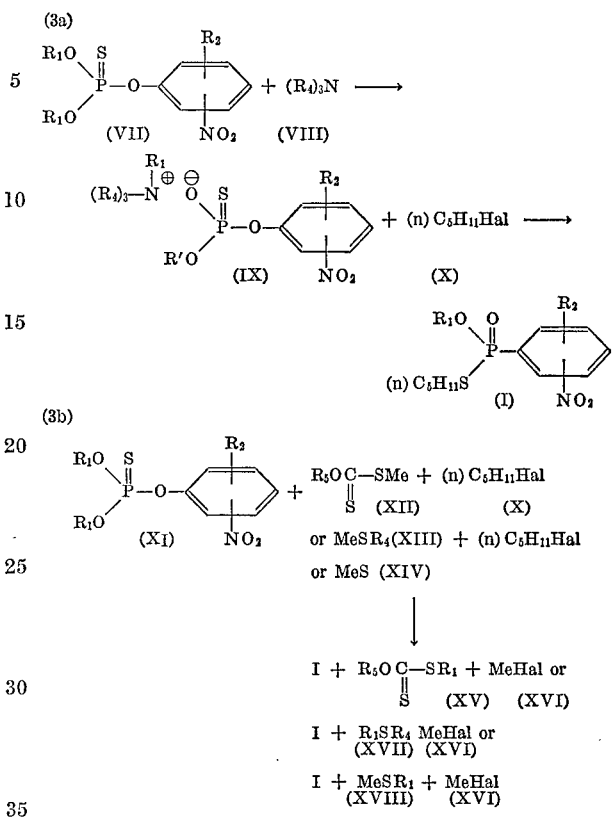

In the formulate, $R_1$ and $R_2$ have the meanings given for the formula I, Me represents an alkali metal, in particular sodium or potassium, or the group $(R_4)_3$—$\overset{+}{N}H$, wherein $R_4$ represents hydrogen or alkyl, $R_5$ represents an alkyl radical and Hal represents a halogen atom, such as chlorine, bromine or iodine.

Suitable acid binding agents are: tertiary amines, e.g. trialkylamines, pyridine, pyridine bases, dialkyl anilines; inorganic bases, such as hydrides, hydroxides; carbonates and bicarbonates of alkali and alkaline earth metals. During the reactions it is sometimes necessary to use a catalyst, e.g. copper or copper chloride. Processes 1a, 1b, 2, 3a and 3b are carried out at a reaction temperature between 0–130° C., at normal pressure, and in solvents or diluents.

Examples of suitable solvents or diluents are: ether and etheral compounds, such as diethyl ether, dipropyl ether, dioxan, tetrahydrofuran; amides, such as N,N-dialkylated carboxylic amides; aliphatic, aromatic, and halogenated hydrocarbons, in particular benzene, toluene, xylenes, chloroform, chlorobenze; nitriles, such as acetonitrile; dimethyl sulphoxide; ketones, such as acetone, methyl ethyl ketone; water.

The starting materials of the formulae II to XI can be manufactured by known methods analogous to those described, for example, in J. Org. Chem., 30, 3217 (1965).

The compounds of the formula I display a broad biocidal activity and are therefore suitable for combating various plant and animal pests and for use as plant growth regulators.

Surprisingly, however, the compounds of the formula I possess in particular insecticidal and acaricidal properties which are superior to those of known analogous compounds and can be used against all development stages, e.g. eggs, larvae, pupae, nymphs and adults, of insects and representatives of the order Acarina, e.g. against insects of the families:

| | |
|---|---|
| Tettigoniida | Tenebrionidae |
| Gryllidae | Chrysomelidae |
| Gryllotalpidae | Bruchidae |
| Blattidae | Tineidae |
| Reduviidae | Noctuidae |
| Phyrrhocoridae | Lymatriidae |
| Cimicidae | Pyralidae |
| Delphacidae | Culicidae |
| Aphididae | Tipulidae |
| Diaspididae | Stomoxydae |
| Pseudococcidae | Trypetidae |
| Scarabacidae | Muscidae |
| Dermestidae | Calliphoridae and |
| Coccinellidae | Pulicidae |

Acarina of the families:

| | |
|---|---|
| Ixodidae | Tetranychidae and |
| Argasidae | Dermanyssidae. |

The insecticidal and/or acaricidal action can be substantially broadened and adapted to suit the particular circumstances by the addition of other insecticides and/or acaricides.

ORGANIC PHOSPHORUS COMPOUNDS

Bis-O,O-diethylphosphoric acid anhydride (TEPP)
Dimethyl-(2,2,2-trichloro-1-hydroxyethyl)-phosphonate (Trichlorfon)
1,2-dibromo-2,2-dichloroethyldimethylphosphate (Naled)
2,2-dichlorovinyldimethylphosphate (Dichlorvos)
2-methoxycarbamyl-1-methylvinyldimethylphosphate (Mevinphos)
Dimethyl-1-methyl-2-(methylcarbamoyl)-vinylphosphate cis (Monocrotophos)
3-(dimethoxyphosphinyloxy)-N,N-dimethyl-cis-crotonamide (Dicrotophos)
2-chloro-2-diethylcarbamoyl-1-methylvinyldimethylphosphate (Phosphamidon)
O,O-diethyl-O-(or S)-2-(ethylthio)-ethylthiophosphate (Demeton)
S-ethylthioethyl-O,O-dimethyl-dithiophosphate (Thiometon)
O,O-diethyl-S-ethylmercaptomethyldithiophosphate (Phorate)
O,O-diethyl-S-2-(ethylthio)ethyldithiophosphate Disulfoxton)
O,O-dimethyl-S-2-(ethylsulphinyl)ethylthiophosphate (Oxydemeton Methyl)
O,O-dimethyl-S-(1,2-dicarbethoxyethyldithiophosphate (Malathion)
O,O,O,O-tetraethyl-S,S'-methylene-bis-dithiophosphate (Ethion)
O-ethyl-S,S-dipropyldithiophosphate
O,O-dimethyl-S-(N-methyl-N-formylcarbamoylmethyl)-dithiophosphate (Formothion)
O,O-dimethyl-S-(N-methylcarbamoylmethyl)dithiophosphate (Dimethoate)
O,O-dimethyl-O-p-nitrophenylthiophosphate (Parathion-Methyl)
O,O-diethyl-O-p-nitrophenylthiophosphate (Parathion)
O-ethyl-O-p-nitrophenylphenylthiophosphate (EPN)
O,O-dimethyl-O-(4-nitro-m-tolyl)thiophosphate (Fenitrothion)
O,O-dimethyl-O-2,4,5-trichlorophenylthiophosphate (Ronnel)
O-ethyl-O,2,4,5-trichlorophenylethylthiophosphate (Trichloronate)
O,O-dimethyl-O-2,5-dichloro-4-bromophenylthiophosphate (Bromophos)
O,O-dimethyl-O-(2,5-dichloro-4-iodophenyl)-thiophosphate (Jodofenphos)
4-tert.butyl-2-chlorophenyl-N-methyl-O-methylamidophosphate (Crufomate)
O,O-dimethyl-O-(3-methyl-4-methylmercaptophenyl) thiophosphate (Fenthion)
Isopropylamino-O-ethyl-O-(4-methylmercapto-3-methylphenyl)phosphate
O,O-diethyl-O-p-(methylsulphinyl)phenyl-thiophosphate (Fensulfothion)
O-p-(dimethylsulphamido)phenyl-O,O-dimethylthiophosphate (Famphur)
O,O,O',O'-tetramethyl-O,O'-thiodi-p-phenylenethiophosphate
O-ethyl-S-phenyl-ethyldithiophosphate
O,O-dimethyl-O-(α-methylbenzyl-3-hydroxycrotonyl) phosphate
2-chloro-1-(2,4-dichlorophenyl)vinyl-diethylphosphate (Chlorfenvinphos)
1-chloro-1-(2,4,5-trichlorophenyl)vinyl-dimethylphosphate
O-[2-chloro-1-(2,5-dichlorophenyl)]vinyl-O,O-diethylthiophosphate
Phenylglyoxylonitriloxime-O,O-diethylthiophosphate (Phoxim)
O,O-diethyl-O-(3-chloro-4-methyl-2-oxo-2-H-1-benzopyran-7-yl)thiophosphate (Coumaphos)
2,3-p-dioxandithiol-S,S-bis(O,O-diethyldithiophosphate) (Dioxathion)
5-[(6-chloro-2-oxo-3-benzoxazolinyl)methyl]O,O-diethylthiophosphate (Phosalone)
2-(diethoxyphosphinylimino)-1,3-dithiolane
O,O-dimethyl-S-[2-methoxy-1,3,4-thiadiazol-5-(4H)-onyl-(4)-methyl]dithiophosphate
O,O-dimethyl-S-phthalimidomethyl-dithiophosphate (Imidan)
O,O-diethyl-O-(3,5,6-trichloro-2-pyridyl)thiophosphate
O,O-diethyl-O-2-pyrazinylthiophosphate (Thionazin)
O,O-diethyl-O-(2-isopropyl-4-methyl-6-pyrimidyl)thiophosphate (Diazinon)
O,O-diethyl-O-(2-quinoxalyl)thiophosphate
O,O-dimethyl-S-(4-oxo-1,2,3-benzotriazin-3(4H)-ylmethyl)dithiophosphate (Azinphosmethyl)
O,O-diethyl-S-(4-oxo-1,2,3-benzotriazin-3(4H)-ylmethyl)dithiophosphate (Azinphosethyl)
S-[(4,6-diamino-s-triazin-2-yl)methyl]-O,O-dimethyldithiophosphate (Menazon)
O,O-dimethyl-O-(3-chloro-4-nitrophenyl)thiophosphate (Chlorthion)
O,O-dimethyl-O(or S)-2-(ethylthioethyl)thiophosphate (Demeton-S-Methyl)
2-(O,O-dimethyl-phosphoryl-thiomethyl)-5-methoxypyrone-4-3,4-dichlorobenzyl-triphenylphosphonium-chloride
O,O-diethyl-S-(2,5-dichlorophenylthiomethyl)dithiophosphate (Phenkapton)
O,O-diethyl-O-(4-methyl-cumarinyl-7-)-thiophosphate (Potasan)
5-amino-bis(dimethylamido)phosphinyl-3-phenyl-1,2,4-triazole (Triamiphos)
N-methyl-5-(O,O-dimethylthiolphosphoryl)-3-thiavaleramide (Vamidothion)
O,O-diethyl-O-[2-dimethylamino-4-methylpyrimidyl-(6)]-thiophosphate (Diocthyl)
O,O-dimethyl-S-(methylcarbamoylmethyl)-thiophosphate (Omethoate)
O-ethyl-O-(8-quinolinyl)-phenylthiophosphonate (Oxinothiophos)
O-methyl-S-methyl-amidothiophosphate (Monitor)
O-methyl-O-(2,5-dichloro-4-bromophenyl)-benzothiophosphate (Phosvel)
O,O,O,O-tetrapropyldithiophosphate
3-(dimethoxyphosphinyloxy)-N-methyl-N-methoxy-cis-crotonamide
O,O-dimethyl-S-(N-ethylcarbamoylmethyl)dithiophosphate (Ethoate-Methyl)

O,O-diethyl-S-(N-isopropylcarbamoylmethyl)-dithiophosphate (Prothoate)
S-N-(1-cyano-1-methylethyl)carbamoylmethyldiethylthiolphosphate (Cyanthoate)
S-(2-acetamidoethyl)-O,O-dimethyldithiophosphate
Hexamethylphosphoric acid triamide (HEMPA)
O,O-dimethyl-O-(2-chloro-4-nitrophenyl)thiophosphate (Dicapthon)
O,O-dimethyl-O-p-cyanophenyl thiophosphate (Cyanox)
O-ethyl-O-p-cyanophenylthiophosphonate
O,O-diethyl-O-2,4-dichlorophenylthiophosphate (Dichlorfenthion)
O,2,4-dichlorophenyl-O-methylisopropylamidothiophosphate
O,O-diethyl-O-2,5-dichloro-4-bromophenylthiophosphate (Bromophos-Ethyl)
Dimethyl-p-(methylthio)phenylphosphate
O,O-dimethyl-O-p-sulphamidophenylthiophosphate
O-[p-(p-chlorophenyl)azophenyl]O,O-dimethylthiophosphate (Azothoate)
O-ethyl-S-4-chlorophenyl-ethyldithiophosphate
O-isobutyl-S-p-chlorophenyl-ethyldithiophosphate
O,O-dimethyl-S-p-chlorophenylthiophosphate
O,O-dimethyl-S-(p-chlorophenylthiomethyl)dithiophosphate
O,O-diethyl-p-chlorophenylmercaptomethyl-dithiophosphate (Carbophenothion)
O,O-diethyl-S-p-chlorophenylthiomethyl-thiophosphate
O,O-dimethyl-S-(carbethoxy-phenylmethyl)dithiophosphate (Phenthoate)
O,O-diethyl-S-(carbofluorethoxy-phenylmethyl)-dithiophosphate
O,O-dimethyl-S-carboisopropoxy-phenylmethyl)-dithiophosphate
O,O-diethyl-7-hydroxy-3,4-tetramethylene-coumarinyl-thiophosphate (Coumithoate)
2-methoxy-4-H-1,3,2-benzodioxaphosphorin-2-sulphide
O,O-diethyl-O-(5-phenyl-3-isooxazolyl)thiophosphate
2-(diethoxyphosphinylimino)-4-methyl-1,3-dithiolane
tris-(2-methyl-1-aziridinyl)-phosphine oxide (METEPA)
S-(2-chloro-1-phthalimidoethyl)-O,O-diethyldithiophosphate
N-hydroxynaphthalimido-diethylphosphate
dimethyl-3,5,6-trichloro-2-pyridylphosphate
O,O-dimethyl-O-(3,5,6-trichloro-2-pyridyl)thiophosphate
S-2-(ethylsulphonyl)ethyl dimethylthiolphosphate (Dioxydemeton-S-Methyl)
diethyl-S-2-(ethylsulphinyl)ethyl dithiophosphate (Oxidisulfoton)
bis-O,O-diethylthiophosphoric acid anhydride (Sulfotep)
dimethyl-1,3-di(carbomethoxy)-1-propen-2-yl-phosphate
dimethyl-(2,2,2-trichloro-1-butyroyloxyethyl)phosphate (Butonate)
O,O-dimethyl-O-(2,2-dichloro-1-methoxy-vinyl)phosphate
bis-(dimethylamido)fluorphosphate (Dimefox)
3,4-dichlorobenzyl-triphenylphosphoniumchloride
dimethyl-N-methoxymethylcarbamoylmethyl-dithiophosphate (Formocarbam)
O,O-diethyl-O-(2,2-dichloro-1-chloroethoxyvinyl)phosphate
O,O-dimethyl-O-(2,2-dichloro-1-chloroethoxyvinyl)phosphate
O-ethyl-S,S-diphenyldithiolphosphate
O-ethyl-S-benzyl-phenyldithiophosphonate
O,O-diethyl-S-benzyl-thiolphosphate
O,O-dimethyl-S-(4-chlorophenylthiomethyl)dithiophosphate (Methylcarbophenothion)
O,O-dimethyl-S-(ethylthiomethyl)dithiophosphate
diisopropylaminofluorophosphate (Mipafox)
O,O-dimethyl-S-(morpholinylcarbamoylmethyl)dithiophosphate (Morphothion)
bismethylamido-phenylphosphate
O,O-dimethyl-S-(benzenesulphonyl)dithiophosphate
O,O-dimethyl-(S and O)-ethylsulphinylethylthiophosphate
O,O-diethyl-O-4-nitrophenylphosphate
triethoxy-isopropoxy-bis(thiophosphinyl)disulphide
2-methoxy-4H-1,3,2-benzodioxaphosphorin-2-oxide
octamethylpyrophosphoramide (Schradan)
bis-(dimethoxythiophosphinylsulphido)-phenylmethane
N,N,N',N'-tetramethyldiamidofluorophosphate (Dimefox)
O-phenyl-O-p-nitrophenyl-methanethiophosphonate (Colep)
O-methyl-O-(2-chloro-4-tert.butyl-phenyl)-N-methyl-amidothiophosphate (Narlene)
O-ethyl-O-(2,4-dichlorophenyl)-phenylthiophosphonate
O,O-diethyl-O-(4-methylmercapto-3,5-dimethylphenyl)-thiophosphate
4,4'-bis-(O,O-dimethylthiophosphoryloxy)-diphenyl disulphide
O,O-di-(β-chloroethyl)-O-(3-chloro-4-methyl-coumarinyl-7)-phosphate
S-(1-phthalimidoethyl)-O,O-diethyldithiophosphate
O,O-dimethyl-O-(3-chloro-4-diethylsulphamylphenyl)-thiophosphate
O-methyl-O-(2-carbisopropoxyphenyl)-amidothiophosphate
5-(O,O-dimethylphosphoryl)-6-chloro-bicyclo(3.2.0)-heptadiene(1,5)
O-methyl-O-(2-i-propoxycarbonyl-1-methylvinyl)-ethyl-amidothiophosphate.

NITROPHENOLS AND DERIVATIVES 4,6-dinitro-6-methylphenol, sodium salt [Dinitrocresol]
dinitrobutylphenol-(2,2',2")-triethanolamine salt
2-cyclohexyl-4,6-dinitrophenyl [Dinex]
2-(1-methylheptyl)-4,6-dinitrophenyl-crotonate [Dinocap]
2-sec.-butyl-4,6-dinitrophenyl-3-methyl-butenoate [Binapacryl]
2-sec.-butyl-4,6-dinitrophenyl-cyclopropionate
2-sec.-butyl-4,6-dinitrophenylisopropylcarbonate [Dinobuton].

MISCELLANEOUS pyrethin I
pyrethin II
3-allyl-2-methyl-4-oxo-2-cyclopentan-1-yl-chrysanthemumate (Allethrin)
6-chloropiperonyl-chrysanthemumate (Barthrin)
2,4-dimethylbenzyl-chrysanthemumate (Dimethrin)
2,3,4,5-tetrahydrophthalimidomethylchrysanthemumate
4-chlorobenzyl-4-chlorophenylsulphide [Chlorobensid]
6-methyl-2-oxo-1,3-dithiolo-[4,5-b]-quinoxaline (Quinomethionate)
(I)-3-(2-furfuryl)-2-methyl-4-oxocyclopent-2-enyl(I)-(cis+trans)-chrysanthemum-monocarboxylate [Furethrin]
2-pivaloyl-indane-1,3-dione [Pindon]
N'-(4-chloro-2-methylphenyl)-N,N-dimethylformamidine [Chlorophenamidin]
4-chlorobenzyl-4-fluorophenyl-sulphide [Fluorobenside]
5,6-dichloro-1-phenoxycarbamyl-2-trifluoromethyl-benzimidazole [Fenozaflor]
p-chlorophenyl-p-chlorobenzenesulphonate [Ovex]
p-chlorophenyl-benzenesulphonate [Fenson]
p-chlorophenyl-2,4,5-trichlorophenylsulphone [Tetradifon]
p-chlorophenyl-2,4,5-trichlorophenylsulphide [Tetrasul]
p-chlorobenzyl-p-chlorophenylsulphide [Chlorobenside]
2-thio-1,3-dithiolo-(5,6)-quinoxaline [Thiochinox]
prop-2-ynyl-(4-t-butylphenoxy)-cyclohexylsulphite [Propargil].

FORMAMIDINES 1-dimethyl-2-(2'-methyl-4'-chlorophenyl)-formamidine (Chlorphenamidin)
1-methyl-2-(2'-methyl-4'-chlorophenyl)-formamidine
1-methyl-2-(2'-methyl-4'-bromophenyl)-formamidine 1-methyl-2-(2',4'-dimethylphenyl)formamidine
1-n-butyl-1-methyl-2-(2'-methyl-4'-chlorophenyl)-
  formamidine
1-methyl-1-(2'-methyl-4'-chloroaniline-methylene)-
  formamidine
2-(2''-methyl-4''-chlorophenyl-formamidine
1-n-butyl-2-(2'-methyl-4'-chlorophenyl-imino)-
  pyrolidine.

UREA

N-2-methyl-4-chlorophenyl-N',N'-dimethyl-thiourea.

CARBAMATES 1-naphthyl-N-methylcarbamate (Carbaryl)
2-butinyl-4-chlorophenylcarbamate
4-dimethylamino-3,5-xylyl-N-methylcarbamate
4-dimethylamino-3-tolyl-N-methylcarbamate
  (Aminocarb)
4-methylthio-3,5-xylyl-N-methylcarbamate (Methiocarb)
3,4,5-trimethylphenyl-N-methylcarbamate
2-chlorophenyl-N-methylcarbamate (CPMC)
5-chloro-6-oxo-2-norborane-carbonitrile-O-(methyl-
  carbamoyl)-oxime
1-(dimethylcarbamoyl)-5-methyl-3-pyrazolyl-N,N-
  dimethylcarbamate (Dimetilan)
2,3-dihydro-2,2-dimethyl-7-benzofuranyl-N-
  methylcarabamate (Carbofuran)
2-methyl-2-methylthio-propionaldehyde-O-(methyl-
  carbamoyl)-oxime (Aldicarb)
8-quinaldyl-N-methylcarbamate and its salts
methyl-2-isopropyl-4-(methylcarbamoyloxy)carbanilate
m-(1-ethylpropyl)phenyl-N-methylcarbamate
3,5-di-tert.butyl-N-methylcarbamate
m-(1-methylbutyl)phenyl-N-methylcarbamate
2-isopropylphenyl-N-methylcarbamate
2-sec.butylphenyl-N-methylcarbamate
m-tolyl-N-methylcarbamate
2,3-xylyl-N-methylcarbamate
3-isopropylphenyl-N-methylcarbamate
3-tert.butylphenyl-N-methylcarbamate
3-sec.butylphenyl-N-methylcarbamate
3-isopropyl-5-methylphenyl-N-methylcarbamate
  (Promecarb)
3,5-diisopropylphenyl-N-methylcarbamate
2-chloro-5-isopropylphenyl-N-methylcarbamate
2-chloro-4,5-dimethylphenyl-N-methylcarbamate
2-(1,3-dioxolan-2-yl)phenyl-N-methylcarbamate
  (Dioxacarb)
2-(4,5-dimethyl-1,3-dioxolan-2-yl)phenyl-N-methyl-
  carbamate
2-(1,3-dioxolan-2-yl)phenyl-N,N-dimethylcarbamate
2-(1,3-dithiolan-2-yl)-N,N-dimethylcarbamate
2-(1,3-dithiolan-2-yl)phenyl-N,N-dimethylcarbamate
2-isopropoxyphenyl-N-methylcarbamate (Aprocarb)
2-(2-propinyloxy)phenyl-N-methylcarbamate
3-(2-propinyloxy)phenyl-N-methylcarbamate
2-dimethylaminophenyl-N-methylcarbamate
2-diallylaminophenyl-N-methylcarbamate
4-diallylamino-3,5-xylyl-N-methylcarbamate
  (Allyxicarb)
4-benzothienyl-N-methylcarbamate
2,3-dihydro-2-methyl-7-benzofuranyl-N-methyl-
  carbamate
3-methyl-1-phenylpyrazol-5-yl-N,N-dimethylcarbamate
1-isopropyl-3-methylpyrazol-5-yl-N,N-dimethyl-
  carbamate (Isolan)
2-dimethylamino-5,6-dimethylpyridimidin-4-yl-N,N-
  dimethyl-carbamate
3-methyl-4-dimethylaminomethyleneiminophenyl-
  N-methylcarbamate
3,4-dimethylphenyl-N-methylcarbamate
2-cyclopentylphenyl-N-methylcarbamate
3-dimethylamino-methyleneiminophenyl-N-methyl-
  carbamate (Formetanate) and its salts
1-methylthio-ethylimino-N-methylcarbamate
  (Methomyl)
2-methylcarbamoyloximino-1,3-dithiolane
5-methyl-2-methylcarbamoyloximino-1,3-oxythiolane
2-(1-methoxy-2-propoxy)phenyl-N-methylcarbamate
2-(1-butin-3-yl-oxy)phenyl-N-methylcarbamate
1-dimethylcarbamyl-1-methylthio-O-methylcarbamyl-
  formoxime
1-(2'-cyanoethylthio)-O-methylcarbamyl-acetaldoxime
1-methylthio-O-carbamyl-acetaldoxime
O-(3-sec.butylphenyl)-N-phenylthio-N-methyl-
  carbamate
2,5-dimethyl-1,3-dithiolane-2-(O-methylcarbamyl)-
  aldoxime)
O-2-diphenyl-N-methylcarbamate
2-(N-methylcarbamyl-oximino)-3-chloro-bicyclo[2.2.1]
  heptane
2-(N-methylcarbamyl)-oximino)-bicyclo[2.2.1]heptane
3-isopropylphenyl-N-methyl-N-chloroacetal-carbamate
3-isopropylphenyl-N-methyl-N-methylthiomethyl-
  carbamate
O-(2,2-dimethyl-4-chloro-2,3-dihydro-7-benzofuranyl)-
  N-methyl-carbamate
O-(2,2,4-trimethyl-2,3-dihydro-7-benzofuranyl)-
  N-methylcarbamate
O-naphthyl-N-methyl-N-acetal-carbamate
O-5,6,7,8-tetrahydronaphthyl-N-methyl-carbamate
3-isopropyl-4-methylthio-phenyl-N-methylcarbamate
3,5-dimethyl-4-methoxy-phenyl-N-methylcarbamate
3-methoxymethoxy-phenyl-N-methylcarbamate
3-allyloxyphenyl-N-methylcarbamate
2-propargyloxymethoxy-phenyl-N-methyl-carbamate
2-allyloxyphenyl-N-methyl-carbamate
4-methoxycarbonylamino-3-isopropylphenyl-N-methyl-
  carbamate
3,5-dimethyl-4-methoxycarbonylamino-phenyl-N-methyl-
  carbamate
2-γ-methylthiopropylphenyl-N-methyl-carbamate
3-(α-methoxymethyl-2-propenyl)-phenyl-N-methyl-
  carbamate
2-chloro-5-tert.-butyl-phenyl-N-methyl-carbamate
4-(methyl-propargylamino-3,5-xylyl-N-methyl-carbamate
4-(methyl-γ-chloroallylamino)-3,5-xylyl-N-methyl-
  carbamate
4-(methyl-β-chloroallylamino)-3,5-xylyl-N-methyl-
  carbamate
1-(β-ethoxycarbonylethyl)-3-methyl-5-pyrazolyl-N,N-
  dimethyl-carbamate
3-methyl-4-(dimethylamino-methylmercapto-methylene-
  imino(phenyl-N-methylcarbaate
1,3-(carbamoylthio)-2-(N,N-dimethylamino)-propane-
  hydrochloride
5,5-dimethylhydroresorcinoldimethylcarbamate
2-[ethyl-propargylamino]-phenyl-N-methylcarbamate
2-[methyl-propargylamino]-phenyl-N-methylcarbamate
4-[dipropargylamino]-3-tolyl-N-methylcarbamate
4-[dipropargylamino]-3,5-xylyl-N-methylcarbamate
2-[allyl-isopropylamino]-phenyl-N-methylcarbamate
3-[allyl-isopropylamino]-phenyl-N-methylcarbamate.

CHLORINATED HYDROCARBONS

γ-hexachlorocyclohexane [Gammexane; Lindan; γHCH]
1,2,4,5,6,7,8,8-octachloro-3α,4,7,7α'-tetrahydro-4,7-
  methylene indane [Chlordan]
1,4,5,6,7,8,8-heptachloro,3α,4,7,7α-tetrahydro-4,7-
  methylene
indane [Heptachlor]
1,2,3,4,10,10-hexachloro-1,4,4α,5,8,8α-hexahydro-endo-
  1,4-exo-5,8-dimethanonaphthalene [Aldrin]
1,2,3,4,10,10-hexachloro-6,7-epoxy-1,4,4α,5,6,7,8,8α-octa-
  hydro-exo-1,4,endo-5,8-dimethanonaphthalene
  [Diflorin]
1,2,3,4,10,10-hexachloro-5,7-epoxy-1,4,4α,5,6,7,8,8α-octy-
  hydro-endo-endo-5,8-dimethanonaphthalene [Endrin].

The active substances of the formula I are also suitable for combating representatives of the division Thallophyta, e.g. viruses, bacteria and fungi. They thus possess fungicidal properties against phytopathogenic fungi on various cultivated plants, such as cereals, maize, rice, vegetables, ornamental plants, fruit trees, vines, farm products, etc.

With the new active substances it is possible to control or destroy fungi occurring on fruit, bloosom, leaves, stems, tubers and roots, and from which parts of plants which grow later then also remain free. The active substances of the formula I are active in particular against phytopathogenic fungi belonging to the following classes: Oomycetes, Zygomycetes, Ascomycetes, Basidiomycetes, Denteromycetes.

In addition, the new active substances can also be used for treating seeds, fruit, tubers etc., and protecting them from fungus infections, for example from smut fungi of all kinds, such as Ustilaginales, e.g. Ustilago, Tilletia, Urocystis, Turbicinia and Phoma types.

In addition to the above cited acaricides and insecticides, it is also possible to admix the active substances of the formula I with, for example, bactericides, fungistatic agents, bacteriostatic agents, nematocides and/or e.g. the following fungicides, in order to broaden the activity spectrum:

dodecylguanidine acetate (Dodine)
pentachloronitrobenzene (Quintozene)
pentachlorophenol (PCP)
2-(1-methyl-n-propyl)-4,6-dinitrophenyl-2-methyl-crotonate (Binapacryl)
2-(1-methyl-n-heptyl)-4,6-dinitrophenylcrotonate (Dinocap)
2,6-dichloro-4-nitroaniline (Dichloran)
2,3,5,6-tetrachloro-benzoquinone (1,4) (Chloranil)
2,3-dichloro-naphthoquinone (1,4) (Dichlone)
N-(trichloromethylthio) phthalimide (Folpat)
N-(trichloromethylthio) cyclohex-4-ene-1,2-dicarboximide (Captan)
N-(1,1,2,2-tetrachloroethylthio)cyclohex-4-ene-1,2-dicarboximide (Captafol)
N-methansulfonal-N-trichloromethylthio-chloraniline
N'-dichlorofluoromethylthio-N,N-dimethyl-N'-phenyl-sulphamide (Dichlofluanid)
O-ethyl-S-benzyl-phenyldithiophosphate
O,O-diethyl-S-benzyl-thiolphosphate
disodium-ethylene-1,2-bis-dithiocarbamate (Nabam)
zinc-ethylene-1,2-bis-dithiocarbamate (Zineb)
manganese-ethylene-1,2-bis-dithiocarbamate (polymeric) (Maneb)
tetramethylthiuramdisulphide (Thiram)
1-oxy-3-acetyl-6-methyl-cyclohexene-(5)dione-(2,4) (Dehydro-Acetic Acid)
8-hydroxyquinoline (8-Quinolinol)
2-dimethylamino-6-methyl - 5 - n - butyl-4-hydroxy - pyrimindine
methyl-N-benzimidazole - 2 - yl - N - (butylcarbamoyl) carbamate (Benomyl)
2-ethylamino - 6 - methyl - 5n - butyl-4-hydroxypyrimidine
2,3-dicyano-1,4-dithia-anthraquinone (Dithianon)
2-(4-thiazolyl)-benzimidazole
3,5-dimethyltetrahydro - 1,3,5 - thiadiazine - 2 - thione (Dazomet)
2,3-dihydro-5-carboxanilido-6-methyl-1,4-oxathine
pentachlorobenzyl alcohol.

Furthermore, the compounds of the formula I are suitable for combating plant pathogenic nematodes.

The compounds of the formula I may be used as pure active substance or together with suitable carriers and/or additives. Suitable carriers and additives can be solid or liquid and correspond to the substances conventionally used in formulation technique such, for example, as solvents, dispersants, wetting agents, adhesives, thickeners, binders and/or fertilisers.

For application, the compounds of the formula I may be processed to dusts, emulsion concentrates, granules, dispersions, sprays, to solutions, or suspensions, in the conventional formulation which is commonly employed in application technology. Mention may also be made of cattle dips and spray races, in which aqueous preparations are used.

The agents according to the invention are manufactured in known manner by intimately mixing and/or grinding active substances of the formula I with the suitable carriers, optionally with the addition of dispersants or solvents which are inert towards the active substances. The active substances may take, and be used in, the following forms.

Solid forms:
  Dusts, tracking agents, granules, coated granules, impregnated granules and homogeneous granules.
Liquid forms:
  (a) active substances which are dispersible in water: wettable powders, pasts, emulsions;
  (b) solutions.

To manufacture solid forms (dusts, tracking agents), the active substances are mixed with solid carriers. Suitable carriers are, for example: kaolin, talcum, bolus, loess, chalk, limestone, ground limestone, attaclay, dolomite, diatomaceous earth, precipitated silica, alkaline earth silicates, sodium and potassium aluminum silicates (feldspar and mica), calcium and magnesium sulphates, magnesium oxide, ground synthetic materials, fertilisers, for example ammonium sulphate, ammonium phosphate, ammonium nitrate, urea, ground vegetable products, such as corn meal, bark dust, sawdust, nutshell meal, cellulose powder, residues of plant extractions, activated charcoal etc. These substances can either be used singly or in admixture with one another.

Granules can be very easily manufactured by dissolving an active substance of the formula I in an organic solvent and applying the resulting solution to a granulated material, for example attapulgite, $SiO_2$, granicalcium, bentonite etc. and then evaporating the solvent.

Polymer granules can also be manufactured by mixing the active substances of the formula I with polymerisable compounds (urea/formaldehyde; dicyandiamide/ formaldehyde; melamine/formaldehyde or others), whereupon a mild polymerisation is carried out that does not affect the active substances and in the process of which the granulation is carried out during the gel formation. It is more advantageous to impregnate finished, porous polymer granules (urea/formaldehyde, polyacrylonitrile, polyester or others) which have a specific surface area and a favourable predeterminable adsorption/desorption ratio, with the active substances, for example in the form of their solutions (in a low boiling solvent) and to remove the solvent. Polymer granules of this kind in the form of microgranules having a bulk density of 300 g./liter to 600 g./liter can also be manufactured with the aid of atomisers. The dusting can be carried out from aircraft over extensive areas of cultures of useful plants.

It is also possible to obtain granules by compacting the carrier with the active substance and carriers and subsequently comminuting the product.

To these mixtures can also be added additives which stabilise the active substance and/or non-ionic, anionic and cationic surface active substances, which, for example, improve the adhesion of the active ingredients on plants or parts of plants (adhesives and agglutinants) and/or ensure a better wettability (wetting agents) and dispersibility (dispersing agents). Examples of suitable adhesives are the following: olein/chalk mixture, cellulose derivatives (methyl cellulose, carboxymethyl cellulose), hydroxyethyl glycol ethers of monoalkyl and dialkyl phenols having 5 to 15 ethylene oxide radicals per molecule and 8 to 9 carbon atoms in the alkyl radical, lignin sulphonic acids, their alkali metal and alkaline earth metal salts, polyethylene glycol ethers (carbowaxes), fatty alcohol polyethylene glycol ethers having 5 to 20 ethylene oxide radicals per molecule and 8 to 18 carbon atoms in the fatty alcohol moiety, condensation products of ethylene oxide/propylene oxide, polyvinyl pyrrolidones, polyvinyl alcohols, condensation products of urea and formaldehyde, and also latex products.

The water-dispersible concentrates of the active substance, i.e. wettable powders, pastes and emulsifiable concentrates, are agents which can be diluted with water to any concentration desired. They consist of active substance, carrier, optionally additives which stabilise the active substance, surface-active substance and anti-foam agents and, optionally, solvents.

Wettable powders and pastes are obtained by mixing and grinding the active substances with dispersing agents and pulverulent carriers in suitable apparatus until homogeneity is attained. Suitable carriers are, for example, those mentioned for the solid forms of application. In some cases it is advantageous to use mixtures of different carriers. As dispersing agents there can be used, for example, condensation products of sulphonated naphthalene and sulphonated naphthalene derivatives with formaldehyde, condensation products of naphthalene or naphthalene sulphonic acids with phenol and formaldehyde, as well as alkali, ammonium and alkaline earth metal salts of lignin sulphonic acid, in addition, alkylaryl sulphonates, alkali and alkaline earth metal salts of dibutyl naphthalene sulphonic acid, fatty alcohol sulphates such as salts of sulphated hexadecanols, heptadecanols, octadecanols, and salts of sulphated fatty alcohol glycol ethers, the sodium salt of oleoyl ethionate, the sodium salts of oleoyl methyl tauride, ditertiary acetylene glycols, dialkyl dilauryl ammonium chloride and fatty acid alkali and alkaline earth metal salts.

Suitable anti-foam agents are silicones.

The active substances are mixed, ground, sieved and strained with the additives cited hereinabove in such a manner that, the size of the solid particles does not exceed 0.02 to 0.04$\mu$ in wettable powders, and 0.03$\mu$ in pastes. To produce emulsifiable concentrates and pastes, dispersing agents such as those cited above, organic solvents, and water are used. Examples of suitable solvents are: alcohols, benzene, xylene, toluene, dimethyl sulphoxide, and mineral oil fractions which boil between 120° and 350° C. The solvents must be practically odourless, not phytotoxic, and inert to the active substances.

Furthermore, the agents according to the invention can be applied in the form of solutions. For this purpose the active substances, or several active substances of the general formula I, are dissolved in suitable organic solvents, mixtures of solvents or in water. Aliphatic and aromatic hydrocarbons, chlorinated derivatives thereof, alkyl naphthalenes, and mineral oils, singly or in admixture with each other, can be used as organic solvents.

The content of active substance in the above described agents is between 0.1% to 95%, in which connection it should be mentioned that, in the case of application from aircraft or some other suitable means of application, it is possible to use concentrations of up to 99.5% or even pure active substance.

The active substances of the formula I can, for example, be formulated as follows:

DUSTS

The following substances are used to manufacture (a) a 5% and (b) a 2% dust:

(a)

| | Parts |
|---|---|
| Active substance | 5 |
| Talcum | 95 |

(b)

| | Parts |
|---|---|
| Active substance | 2 |
| Highly disperse silicic acid | 1 |
| Talcum | 97 |

The active substances are mixed with the carriers and ground.

GRANULES

The following substances are used to produce 5% granules:

| | Parts |
|---|---|
| Active substance | 5 |
| Epichlorohydrin | 0.25 |
| Cetyl polyglycol ether | 0.25 |
| Polyethylene glycol | 3.50 |
| Kaolin (particle size 0.3–0.8 mm.) | 91 |

The active substance is mixed with epichlorohydrin and dissolved with 6 parts of acetone; the polyethylene glycol and cetyl polyglycol ether are then added. The thus obtained solution is sprayed on kaolin, and the acetone subsequently evaporated in vacuo.

WETTABLE POWDER

The following constituents are used for the preparation of (a) a 40%, (b) and (c) a 25%, and (d) a 10% wettable powder:

(a)

| | Parts |
|---|---|
| Active substance | 40 |
| Sodium lignin sulphonate | 5 |
| Sodium dibutyl-naphthalene sulphonate | 1 |
| Silicic acid | 54 |

(b)

| | Parts |
|---|---|
| Active substance | 25 |
| Calcium lignin sulphonate | 4.5 |
| Champagne chalk/hydroxyethyl cellulose mixture (1:1) | 1.9 |
| Sodium dibutyl naphthalene sulphonate | 1.5 |
| Silicic acid | 19.5 |
| Champagne chalk | 19.5 |
| Kaolin | 28.1 |

(c)

| | Parts |
|---|---|
| Active substance | 25 |
| Isooctylphenoxy - polyoxyethylene - ethanol | 2.5 |
| Champagne chalk/hydroxyethyl cellulose mixture (1:1) | 1.7 |
| Sodium aluminium silicate | 8.3 |
| Kieselguhr | 16.5 |
| Kaolin | 46 |

(d)

| | Parts |
|---|---|
| Active substance | 10 |
| Mixture of the sodium salts of saturated fatty alcohol sulphates | 3 |
| Naphthalenesulphonic acid/formaldehyde condensate | 5 |
| Kaolin | 82 |

The active substances are intimately mixed, in suitable mixers, with the additives, the mixture being then ground in the appropriate mills and rollers. Wettable powders are obtained which can be diluted with water to give suspensions of any desired concentration.

EMULSIFIABLE CONCENTRATES

The following substances are used to produce (a) a 10% and (b) a 25% emulsifiable concentrate:

(a)

| | Parts |
|---|---|
| Active substance | 10 |
| Epoxidised vegetable oil | 3.4 |
| Combination emulsifier consisting of fatty alcohol polyglycol ether and alkylarylsulphonate calcium salt | 13.4 |
| Dimethylformamide | 40 |
| Xylene | 43.2 |

(b)

| | Parts |
|---|---|
| Active substance | 25 |
| Epoxidised vegetable oil | 2.5 |
| Alkylarylsulphonate/fatty alcohol-polyglycol ether mixture | 10 |
| Dimethylformamide | 5 |
| Xylene | 57.5 |

From these concentrates it is possible to produce, by dilution with water, emulsions of any desired concentration.

SPRAY

The following constituents are used to prepare a 5% spray:

| | Parts |
|---|---|
| Active substance | 5 |
| Epichlorohydrin | 1 |
| Benzine (boiling limits 160°–190° C.) | 94 |

EXAMPLE 1

O-ethyl-S-n-pentyl-O-(3-nitrophenyl)-thiophosphoric ester

To a solution of 18.1 g. of m-nitrophenol in 150 ml. of benzene are added 13.3 g. triethylamine. While stirring constantly, 28 g. of O-ethyl-S-n-pentyl-chlorothiolphosphoric ester are added dropwise at 10–15° C. The reaction mixture is stirred for 12 hours, then washed with water, 3% Na$_2$CO$_3$ solution and again with water, and dried over sodium sulphate. The benzene is distilled off. Molecular distillation of the residue at 135° C./0.001 torr yields the compound of the formula $$\begin{array}{c} C_2H_5-O \quad O \\ \diagdown \; \| \\ P-O-\text{(3-NO}_2\text{-C}_6\text{H}_4\text{)} \\ \diagup \\ (n)C_5H_{11}S \end{array} \qquad n_d^{25}: 1.5248$$

the following compounds are also manufactured in analogous manner:

$$\begin{array}{c} R_1O \quad O \\ \diagdown \; \| \\ P-OR'. \\ \diagup \\ (n)C_5H_{11}S \end{array}$$

| R$_1$ | R' | Physical data |
|---|---|---|
| —C$_2$H$_5$ | 4-NO$_2$-C$_6$H$_4$— | $n_D^{25}$ 1.5256 |
| —C$_2$H$_5$ | 2-NO$_2$-C$_6$H$_4$— | $n_D^{25}$ 1.5229 |
| —C$_2$H$_5$ | 3-NO$_2$-4-CH$_3$-C$_6$H$_3$— | $n_D^{25}$ 1.5233 |

TABLE—Continued

| R$_1$ | R' | Physical data |
|---|---|---|
| —C$_2$H$_5$ | 3-NO$_2$-4-CH$_3$-C$_6$H$_3$— | |
| —C$_2$H$_5$ | 4-NO$_2$-2-Cl-C$_6$H$_3$— | |
| —C$_2$H$_5$ | 3-NO$_2$-4-Cl-C$_6$H$_3$— | |
| —C$_2$H$_5$ | 2-NO$_2$-4-Cl-C$_6$H$_3$— | |
| —C$_2$H$_5$ | 3-NO$_2$-6-CH$_3$-C$_6$H$_3$— | |

What is claimed is:
1. Compound of the formula

$$\begin{array}{c} R_1O \quad O \\ \diagdown \; \| \\ P-O-\text{C}_6\text{H}_3(\text{R}_2)(\text{NO}_2) \\ \diagup \\ (n)C_5H_{11}S \end{array}$$

wherein R$_1$ represents methyl or ethyl, and R$_2$ represents hydrogen, methyl or chlorine.

2. The compound according to claim 1 of the formula $$\begin{array}{c} C_2H_5-O \quad O \\ \diagdown \; \| \\ P-O-\text{(3-NO}_2\text{-C}_6\text{H}_4\text{)} \\ \diagup \\ (n)C_5H_{11}S \end{array}$$

3. The compound according to claim 1 of the formula $$\begin{array}{c} C_2H_5-O \quad O \\ \diagdown \; \| \\ P-O-\text{(4-NO}_2\text{-C}_6\text{H}_4\text{)} \\ \diagup \\ (n)C_5H_{11}S \end{array}$$

4. The compound according to claim 1 of the formula $$\begin{array}{c} C_2H_5-O \quad O \\ \diagdown \; \| \\ P-O-\text{(2-NO}_2\text{-C}_6\text{H}_4\text{)} \\ \diagup \\ (n)C_5H_{11}S \end{array}$$

5. The compound according to claim 1 of the formula $$\begin{array}{c} C_2H_5-O \quad O \\ \diagdown \; \| \\ P-O-\text{(3-NO}_2\text{-4-CH}_3\text{-C}_6\text{H}_3\text{)} \\ \diagup \\ (n)C_5H_{11}S \end{array}$$

References Cited

UNITED STATES PATENTS 3,082,239   3/1963   Mühlmann et al. __ 260—954 X

FOREIGN PATENTS 98,101   2/1964   Denmark _____ 260—954

LORRAINE A. WEINBERGER, Primary Examiner

R. L. RAYMOND, Assistant Examiner

U.S. Cl. X.R.

424—218